United States Patent [19]

Tenta

[11] 3,821,370

[45] June 28, 1974

[54] TOPICAL COMPOSITION FOR TREATING SEBORRHEIC KERATOSIS

[76] Inventor: Louis T. Tenta, 6007 N. Sheridan Rd., Apt. 24a, Chicago, Ill. 60626

[22] Filed: Mar. 11, 1971

[21] Appl. No.: 123,380

[52] U.S. Cl................ 424/145, 424/235, 424/343, 424/DIG. 13
[51] Int. Cl............................................ A61k 27/00
[58] Field of Search...... 424/DIG. 13, 69, 235, 145, 424/343

[56] References Cited
UNITED STATES PATENTS 3,317,382   5/1967   Brunner et al............... 424/DIG. 13

OTHER PUBLICATIONS

Pascher, F., "Dermatologic Formulary," (1957), pp. 34, 38, 74, 75.
Goodman, H., "One Hundred Dermatologic Formulas," (1951), p. 33, 78.

Primary Examiner—Vincent D. Turner
Attorney, Agent, or Firm—Hill, Gross, Simpson, Van Santen, Steadman, Chiara & Simpson

[57] ABSTRACT

A topical composition adapted upon application to the skin to minimize the objectional appearance of surface irregularities, blemishes and discolorations by causing a superficial slough of the damaged portions of the epidermis and a beneficial stimulation of the connective tissue cells of the dermis. The active ingredients of my composition are those furnished by source materials capable of providing active forms of salicylate, resorcinol, phenol and zinc compounds, or are the compounds per se. Additional my composition may contain relatively non-essential ingredients such as substantially anhydrous, non-reactive emollients, demulcents, anesthetics and antiseptics, as for instance glycerin, camphor and lanolin. Instead of using phenol, itself, in my composition it is preferable to use an inactive or inhibited form of phenol, such as an ammonium or alkali metal phenate, or phenolate, capable of being rendered active by exposure to the moisture and carbon dioxide of the atmosphere, which together form carbonic acid ($H_2CO_3$).

5 Claims, No Drawings

TOPICAL COMPOSITION FOR TREATING SEBORRHEIC KERATOSIS

SUMMARY OF THE INVENTION

The present invention relates to a topical composition for application to the skin to improve the external appearance that may be caused by certain skin disorders. In order to understand more clearly the action of my topical composition upon its application to the skin for the general purpose just stated, the following background information might be helpful.

The skin is comprised of two layers, a thin outer layer (epidermis), which is about 0.1 mm. in thickness, and a deeper, thicker layer (dermis) of up to 2-4 mm. thickness, depending upon its location in the human body.

The epidermis is composed of cells arranged in layers, with the outermost layer of cells thickened (or, as sometimes referred to, keratinized or hornified). Pigment cells are present in the deepest layer as well as in the "parent" cells which give rise to generations of younger cells to replace those lost to attrition and to wear and tear.

The dermis contains blood vessels and nerves which provide nutrition and sensation, respectively. Moreover, there are lymphatic vessels present which may be thought of as conveying tissue "juices." Additionally, the structures from which hairs grow (follicles) and glands which lubricate the skin are contained in the dermis. From these structures project small tubes or channels which penetrate the epidermis and open upon the surface of the skin in the form of hairs and/or pores. These structures of the dermis (vessels, nerves, follicles and glands) are surrounded by cells which are referred to as connective tissue cells. These cells may be considered as a support or superstructure for the overlying epidermis as well as supporting the vessels, nerves, follicles and glands within the dermis proper.

Moreover, intertwined among these various cells and structures contained within the dermis are elastic threads or fibers which permit the skin to regain shape after stretching. Additionally, the connective tissue cells are involved in the repair of these tissues from injurious or noxious sources. The repaired area of the tissue is manifested as a scar.

Many disorders may affect the skin. Some are a consequence of a local effect (such as a laceration, or cut) while others may reflect underlying constitutional disorders (such as the yellowing of skin that may occur in liver diseases).

Of those disorders that might be considered as arising from disturbances that are local in nature, certain ones will now be selectively discussed. Various changes occur which may affect the structure of anatomy of the skin. These changes may be manifested as a thickening of the outermost (keratinized or hornified) layer of the epidermis, and the resulting formation of brown or beige-colored warty-like areas (seborrheic keratosis). A change in the pigmentation of the skin may occur which produces random areas of brownish or tan discoloration. Moreover, unsightly scarring may occur as a consequence of acne eruptions or from superficial burns. A loss of the elastic fibers necessary for normal skin consistency may result from the stretch marks of obesity or pregnancy or from the effects of wasting scars.

Additionally, certain types of "birth marks" (which usually result from abnormally formed and expanded blood vessels) affect the color of the skin. Aging alters the skin structure by causing a weakness of the elastic fibers which results in a relaxation of the skin and consequent wrinkling. The objectionable external appearance caused by these disorders may be minimized or corrected in a non-surgical fashion by the application of a composition, such as that disclosed herein, which is gerally not harmful to one's health and which produces two fundamental and simultaneous reactions, —one in the epidermis and another in the dermis.

These reactions occur at the site of the basic disorder and produce two responses, —the one response being that of a superficial slough of the epidermis; and the other response being a stimulation of the connective tissue cells in the dermis. These responses in turn are manifest by a peeling of the outermost skin layer and the consequent removal of surface irregularities, blemishes and discolorations, and by a strengthening of the underlying dermis which results fom an increase in the numbers of connective tissue cells which surround and support the hair follicles, glands and vessels. This produces a firmer and more consistent support for the skin, which is manifest by a minimizing of depressions, wrinkles and scars. Moreover, this same response may cause the obliteration or collapse of certain poorly formed blood vessels in the dermis and result in the disappearance or fading of certain types of birth marks.

The composition of my invention is applied to the skin surface in either the immediately active form, or in a de-activated form which can be rendered active, as by the application thereto of an activating agent. When the composition is applied in its active form, or as soon as it assumes its active form, a reaction occurs that is characterized by a warmth and redness, or blushing of the skin. This response is followed quickly in turn by a frosting of the skin and a sensation of tautness or tightening. These reactions occur within minutes after the application of the composition if in an active form, or after the composition has been converted into its active form. Over the next 3 to 5 days the skin takes on the character of an onion skin, somewhat rusty or violaceous in color, following which a flaking or peeling occurs which exposes from beneath a clearer, cleaner, smoother appearing surface.

The topical composition of my invention is initially in an inhibited state in the form of a salve, lotion, or semi-solid cream for application as such or as a bandage for application to the locus of the skin disorder. Where the composition is in its relatively inactive or de-activated form, it can be applied to the skin manually, as by spreading it onto the skin through the use of the fingers, with or without a rub-in action. However, if the composition were in an active state, containing free phenol rather than a phenol salt, it would be preferable not to apply the preparation manually through direct contact with the fingers or hand since the presence of free phenol above a certain concentration level may result in an unpleasant reaction.

To avoid such unpleasant reaction, it is preferable to use an inhibited phenol or an inactivated form of phenol, such as an ammonium or alkali metal salt of phenol, as for instance, sodium or potassium phenate. A salt of the phenol results in a slower reaction upon the skin and therefore greater freedom in its use and application. Activation of a phenol salt depends upon hydrolysis of the salt to liberate phenol, and this may take place merely upon exposure of the phenol salt to the atmosphere, due to the water vapor and carbon dioxide contained therein, or hydrolysis may be brought about by application to the phenol salt of a mild acid, such as acetic acid, or a very dilute acid, such as 0.1 N-hydrochloric acid. At room temperature it may require 15 to 30 minutes for the hydrolysis to take place and cause effective amounts of the free phenol to be liberated, depending upon the concentration of water vapor and carbon dioxide gas in the atmosphere.

SPECIFIC DISCLOSURE OF INVENTION

The topical composition of my invention includes certain ingredients that are essential to the obtaining of the best results possible from the use of my composition and other ingredients that are optional. Such essential ingredients may be present as such, or may be present in a form of source material that makes available the essential ingredients during preparation or during normal use of the composition.

In its preferred form, my topical composition consists essentially of the following active ingredients, or the following source materials of such ingredients, in approximately the proportions by weight indicated:

EXAMPLE 1

| | |
|---|---|
| salicylate—source material (calculated as sodium salicylate) | 1 part by weight |
| resorcinol | 5 parts by weight |
| phenol—source material (calculated as phenol) | 15–40 parts by weight |
| zinc—source material (calculated as $ZnSO_4$) | 4 parts by weight |

Where the phenol-source material is phenol, itself, the weight proportion is as indicated, namely, from 15 to 40 parts by weight of phenol, or carbolic acid; but where the phenol is present in the form of a phenol salt, such as a potassium phenolate, containing approximately 70 percent by weight of equivalent phenol, the weight of the salt would be from a minimum of about 15/.7, or approximately 20 parts by weight to a maximum of approximately 40/.7, or about 60 parts by weight of potassium phenolate. Other salts, such as sodium or ammonium salts of phenol can be substituted for potassium phenolate in the same weight proportions.

In addition to the active ingredients of my preparation, my composition may contain relatively non-essential ingredients, such as substantially anhydrous, non-reactive emollients, demulcents, anesthetics and antiseptics, such, for instance as glycerin, camphor and lanolin. These relatively non-essential ingredients can be used in the following proportions:

| INGREDIENTS | PARTS BY WEIGHT |
|---|---|
| anhydrous glycerin | 1 |
| camphor | 1 |
| ethyl alcohol (anhydrous or 95%) | 1 |
| fragrances, rose water ointment, anhydrous lanolin and other additives | q.s.a.d. |
| antioxidant (butylhydroxytoluene) | 150 p.p.m. |

Although all of the foregoing ingredients have been used separately and in various combinations for different purposes than my present purpose, the present combination of ingredients within the proportions herein recited to provide a topical composition having the therapeutic properties claimed for my topical composition has not been previously known to the best of my knowledge. The functions of the essential ingredients in my composition are substantially as follows:

The phenol in its active state primarily exerts a keratolytic response, not only superficially but, more importantly and unexpectedly, a response of the subdermal fibrosis and perifollicular hyperplasia. The superficial loss of the outer layers of the skin resulting from the keratolytic response is accompanied by a reaction beneath the skin surface which, to the best of my knowledge, is independent of the keratolysis. This reaction is twofold: first, perifollicular hyperplasia, which implies that the tissues surrounding the hair follicles contained in the skin are stimulated in such manner that an increase in volume and number of these tissues cells occures, resulting in the development of a smoother texture of the skin; and secondly, a notable response of subdermal fibrosis, namely, a response of the cells beneath the level of the skin and as deep as the hair follicles. This response is characterized by an increase in fibroblasts, which are the cells that form scar tissue. The ultimate result clinically is the binding of the epidermis to the underlying dermal tissues, the result of which is a firmer consistency to the skin, and, conversely, a loss of skin laxity. In certain disorders such as hemangiomas, the improvement in skin color that follows the application of my composition is a result of the subdermal and perifollicular fibrosis, which obliterates vascular channels and produces a blanching and more natural skin color.

While phenol by itself engenders a keratolytic response, the resulting reaction is likely to be of such severe intensity that all epithelial elements including pigment cells may be destroyed and irreparable fibrosis may occur. This fibrosis produces a chalk white or waxy unnatural appearance to the skin. Moreover such skin is incapable of reacting to sunlight by tanning in a natural manner. Thus, there is a critical inter-relationship between the various ingredients of my topical composition, and their relative proportions should be such as to evoke the desired optimal response when the composition is used in the recommended manner and in the dosages specified.

The use of zinc in any available form, such as zinc oxide, zinc sulfate, or other zinc compounds, including zinc salicylate, is believed to enhance and augment the subepithelial changes without necessitating any increase in resorcinol and/or phenol concentrations to such a level that irreparable chemical destruction of the epithelium and subepithelial structures may occur.

With respect to other formulations of my topical composition if the phenol is present in the form of a phenol salt, its concentration is kept between about 15 and 40 parts by weight of equivalent phenol, or carbolic acid, and if the other essential ingredients of my composition consisting of one part by weight of salicylate calculated as sodium salicylate, five parts by weight of resorcinol, and four parts by weight of zinc-source material calculated as $ZnSO_4$, are present as specified in my preferred formula, considerable latitude in proportions is permissible in such non-essential ingredients as anhydrous glycerin, camphor, anhydrous lanolin, alcohol and other substantially anhydrous, non-reactive emollients, demulcents, and anesthetics and mild antiseptics. The term "mild antiseptics" is intended to include components that have some antiseptic action but much less than either of the essential ingredients, phenol and resorcinol of my composition.

In general, such other non-essential and substantially anhydrous ingredients, including fragrances, antioxidants, and the like, can be used in amounts that are sufficient to perform their intended functions and bring the total of the finished topical composition up to 100 parts by weight.

In using my topical composition, satisfactory results can usually be obtained by applying to about 20 cm² of skin area from 0.5 to 1 gram of the topical composition given in Example I.

It will be understood that modifications and variations may be effected without departing from the scope of the novel concepts of the present invention.

I claim as my invention:

1. A topical composition for application to skin affected by seborrheic keratosis to provide a superficial slough of the epidermis, said composition being substantially anhydrous and consisting essentially of the following ingredients in effective amounts within approximately the proportions by weight indicated:
   from 20 to 60 parts of an inhibited phenol calculated as potassium phenolate and selected from the group consisting of potassium, sodium and ammonium salts of phenol;
   one part of a salicylate calculated as sodium salicylate and selected from the group consisting of sodium and zinc salicylate;
   five parts of resorcinol; and
   four parts of a zinc compound calculated as zinc sulfate and selected from the group consisting of zinc salicylate, zinc oxide and zinc sulphate that tends to augment the subepithelial changes without necessitating any increase in the resorcinol or phenol concentrations in said composition;
said inhibited phenol being capable of being rendered active during use thereof by exposure to the moisture and carbon dioxide of the atmosphere.

2. A topical composition as defined by claim 1, wherein said salicylate is sodium salicylate.

3. A topical composition as defined by claim 1, wherein said zinc is present as zinc salicylate.

4. A topical composition as defined by claim 1, wherein said zinc is present as anhydrous zinc sulphate.

5. A method of treating the skin to minimize the objectionable appearance of seborrheic keratosis which comprises applying to about 20 cm² of the affected skin area from 0.5 to 1 gram of the topical composition defined by claim 1.

* * * * *